Jan. 24, 1928.                      1,657,398
L. W. HOTTEL ET AL
RUBBER MOLDING APPARATUS
Filed Dec. 10, 1925      3 Sheets-Sheet 3
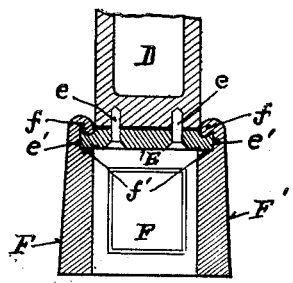
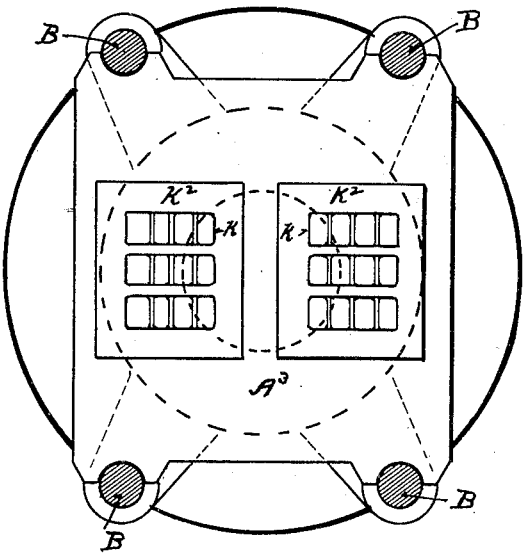
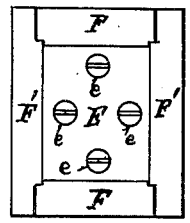
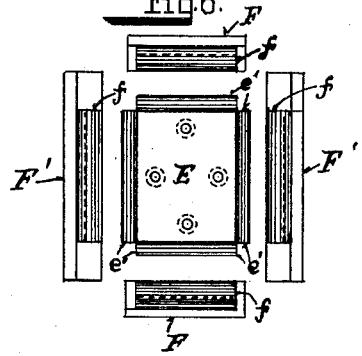
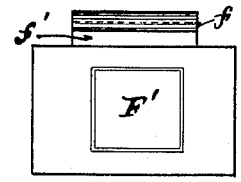
Inventor Patented Jan. 24, 1928.

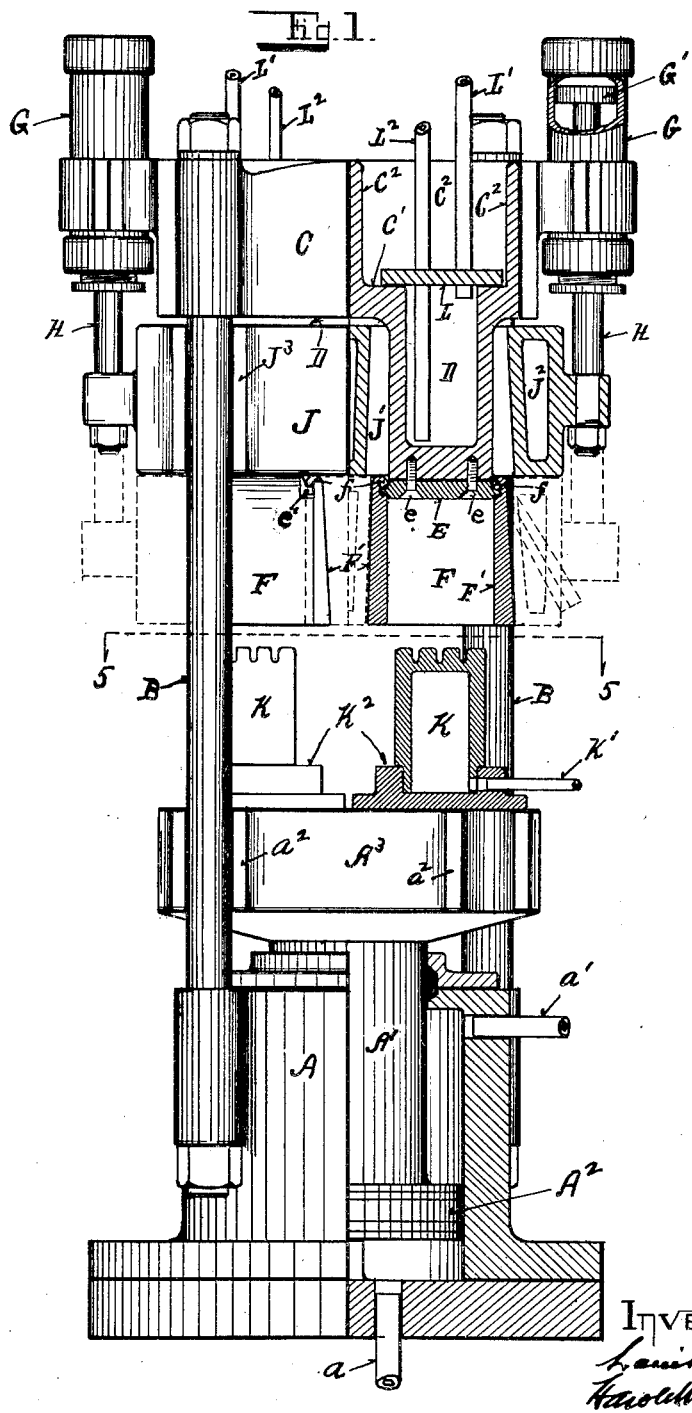

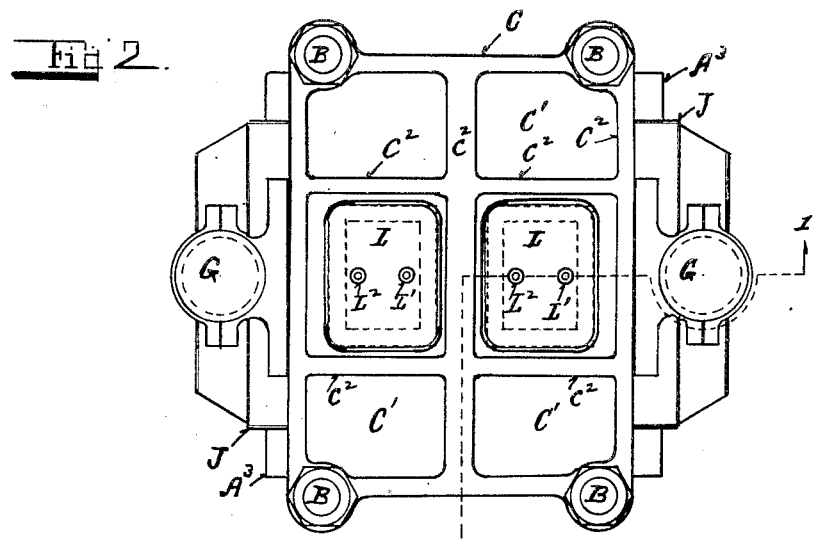
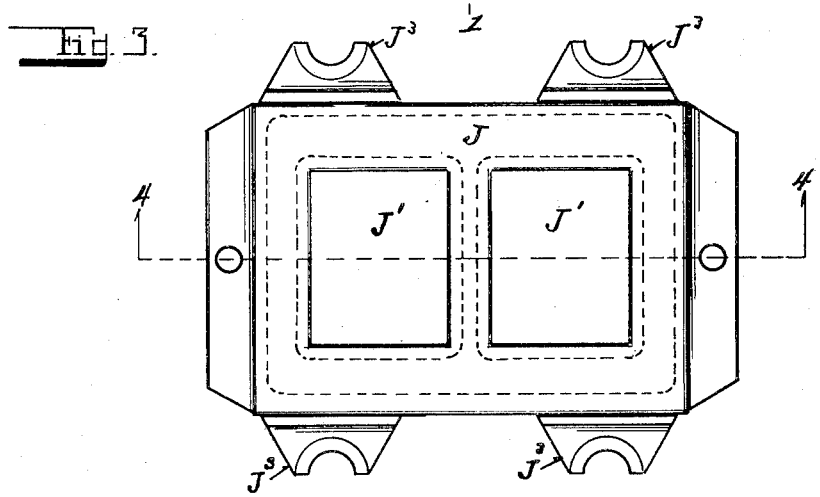
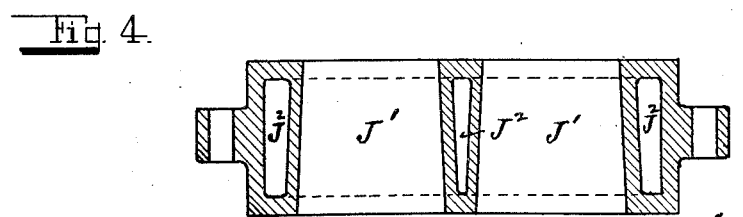

1,657,398

UNITED STATES PATENT OFFICE.

LOUIS W. HOTTEL AND HAROLD M. STURGEON, OF ERIE, PENNSYLVANIA.

RUBBER-MOLDING APPARATUS.

Application filed December 10, 1925. Serial No. 74,512.

This invention relates to molding apparatus.

The object of this invention is to provide press mechanism in which a separable mold box is stationarily supported, in opposition to a pressing table upon which a core-mold is placed, said core-mold being adapted to enter the mold-box, thereby causing the material to be molded to be pressed against the interior of said mold-box when the core-mold is moved into said mold-box by the movement of said pressing table; a further object of this invention is to provide means adapted to retain the walls of said separable mold-box clamped together while said mold-core is being forced into said mold-box, and also to subject said mold-box and core-mold to suitable heat while the molding operation is proceeding.

The features of this invention are hereinafter fully described and pointed out and are illustrated in the accompanying drawings in which:

Figure 1 is a side view of a rubber molding apparatus embodying this invention, partly in elevation and partly in vertical central section on the line 1—1 looking in the direction of the arrow, in Fig. 2.

Figure 2 is a plan view of the same.

Fig. 3 is a plan view of the mold case of our invention, removed from the press.

Figure 4 is a central vertical section thereof on the line 4—4 in Fig. 3.

Figure 5 is a transverse section of our improved press looking downward on the line 5—5 in Fig. 1.

Figure 6 is a central section of the mold box and fragment of the head on our improved press.

Figure 7 is an under side view of the same.

Figure 8 is a plan view of the mold box with the side plates thereof disconnected.

Figure 9 is an elevation of the inside face of one of the side plates thereof.

In these drawings A indicates the cylinder, and A' indicates the usual ram. The ram is provided with a piston $A^2$ at its lower end by means of which power is applied to force a downward movement of the ram, as is usual with double acting rams, $a$ indicates an inlet to the cylinder A under the ram, whereby pressure is applied to force the ram upward, and $a'$ indicates an inlet to admit pressure above the piston $A^2$ to force the ram downward.

Upon the ram A is the bed-plate or press table $A^3$ of the press. B indicates the usual strain rods of the press, and C indicates the head head plate of the press, which is secured upon the upper ends of the strain rods B in the usual manner.

The head plate C consists of a horizontal web C' and vertical truss flange $C^2$.

The head plate is provided with downwardly projecting pockets D to which mold-box bottom plates E are secured by means of tap screws $e$. These plates E are provided with a perimetrical rib $e'$, the upper surface of which rib is longitudinally concave so that it turns upwardly along the outer margins thereof, see Figs. 6, 8 and 9.

Suspended upon the rib $e'$ of the plate E are two end plates F and two side plates F', see Figs. 7 and 8, which can be swung outwardly as indicated by broken lines in Fig. 1, or detached as shown in Fig. 8.

The plates F and F' are provided with inturned lugs $f$ along their upper margins which engage the perimetrical rib $e'$ on the bottom plate E of the mold-box, and are thereby suspended from the bottom plate E of the mold-box, the inner surfaces of the plates F and F' being provided with grooves $f'$ see Figs. 6 and 9, to receive the ribs $e'$ on the plate E. From the foregoing it will be obvious that the plates F and F' of the mold box will be securely retained suspended from the bottom mold box plate E, and yet when desired can be manually disengaged therefrom.

Secured to the head plate C are cylinders G in which are pistons G', having piston rods H.

Suspended on said piston rods H is a mold-box receiving case or flask J having a chamber therein J' into which the separable mold box plates E, F and F' will enter, as hereinafter described, said case or flask J acting to maintain said mold box plates together in opposition to pressure exerted from within said box as hereinafter described.

The outer surfaces of the separable mold-box plates F and F' and the walls of the chamber J' are preferably provided with identical tapers as shown in Fig. 1, so that when the flask J is lowered as hereinafter described the side and end plates of the mold-box will be forced against each other along the adjacent edges.

The mold case or flask J is provided with steam receiving cavities $J^2$ whereby the walls of the flask may be heated.

The flask J is provided with guides $J^3$ which engage the strain rods B of the press, and thereby steady the flask J during its vertical movement as hereinafter described.

The bed-plate $A^3$ of the press is also provided with guides $a^2$ which engage the strain rods B of the press to prevent lateral movement thereof during the vertical movement of the same.

Mounted upon the vertically movable bed-plate $A^3$ are hollow core molds K which are provided with steam inlets K' by means of which steam may be introduced to heat the same. Around the bases of the core mold K is a shoulder $K^2$ adapted to engage the lower edges of the mold-box plates F and F' so that the lower portion of the mold cavity around the core K will be closed and the upward travel of the bed-plate $A^3$ limited thereby, thus effectually sealing the horizontal joints of the mold box. Steam is introduced into the cavities $J^2$ of the flask J in any convenient and usual manner, and the pockets D in the head plate C are provided with covers L, and steam introduced therein through the pipes L', and escapes therefrom by the pipes $L^2$, which extend nearly to the bottom of said pockets thereby providing for the elimination of condensation in said pockets.

In operation steam is introduced into the pockets D to heat the bottom plates E of the mold box, and into the cavities $J^2$ of the flask J, and the same is lowered until the lower surface thereof is even with the lower edges of the mold box plates F and F'; steam is also introduced into the core molds K, and when the parts are sufficiently heated the flask J is raised to the position shown in full lines in Fig. 1, and one of the side plates F or F' is swung outwardly sufficiently to permit placing a mass of rubber compound upon the core molds K, when the flask J is again lowered by the piston rods H until the mold boxes are entirely within the chambers J' as shown by broken lines in Fig. 1.

The ram A' is then caused to raise the bed-plate $A^3$ upwardly thus forcing the core molds K into the mold box, until the upward movement thereof is stopped by the shoulder $K^2$ engaging the lower edges of the mold plates F and F' where it is held under pressure during the required heat period to properly vulcanize the contents of the mold box.

The flask K during this operation maintains the adjacent edges of the separable plates E, F and F' in close contact, so that little, if any, material escapes therefrom.

When the required heat period has elapsed, the pressure under the ram is released, and pressure placed above the piston $A^2$ which aids in withdrawing the core molds K from the molded article within the mold, and when all pressure within the mold box has thus been released, pressure is admitted to the cylinders G under the pistons G' therein, which raises the flask J upwardly to the position thereof shown by full lines in Fig. 1, when one or more of the side plates F' can be disengaged from the bottom plate E, and the molded article removed and placed to cool and harden, while the operation is repeated.

It will be noted that the mold box plates E, F and F' have no vertical movement, but are rigidly supported on the head plate C, while the core molds K, and the flask J are provided with movement with relation to the separable mold box and with each other.

Having thus fully described and illustrated this invention so that others can utilize the same, it is obvious that many changes and modifications can be made therein without departing from the scope thereof, therefore what we claim as new and desire to secure by Letters Patent is:

1. In an apparatus of the class described, a fluid actuated ram, a bed plate on said ram, a core mold on said ram, a head plate in opposition to said ram, a separable mold lining stationarily supported on said head plate, a mold case suspended below said head plate, and fluid actuated means to lower said mold case around said mold lining plates, and raise the same clear of said plates.

2. In a molding press, a ram mechanism, a bed-plate on said ram, a core mold on said bed-plate, a shoulder around the base of said core mold, a head plate in opposition to said bed-plate, a pocket depending from said head plate, a cover for said pocket, a mold box secured to said pocket, a mold flask having a mold receiving recess therein suspended below said head plate, means on said head plate to lower and raise said mold flask, and means to control the temperature of said pocket, flask, and core mold.

3. In a molding press, a bed-plate, a hollow core-mold thereon, a shoulder around the base of said core mold, means to control the temperature of said core mold, a head-plate in opposition to said bed-plate, a separable mold-box secured to said head plate adapted to be engaged by the shoulder around the base of said core mold, a mold flask having a mold-receiving recess therethrough adapted to engage the sides of said mold-box, fluid actuated mechanism secured on said head-plate adapted to lower said flask around said mold-box, said flask having cavities whereby the temperature of the same may be controlled, and a double acting ram under said bed-plate whereby the core-mold may be forced into said core-box and withdrawn therefrom.

In testimony whereof we affix our signatures.

LOUIS W. HOTTEL.
HAROLD M. STURGEON.